Figure 1:
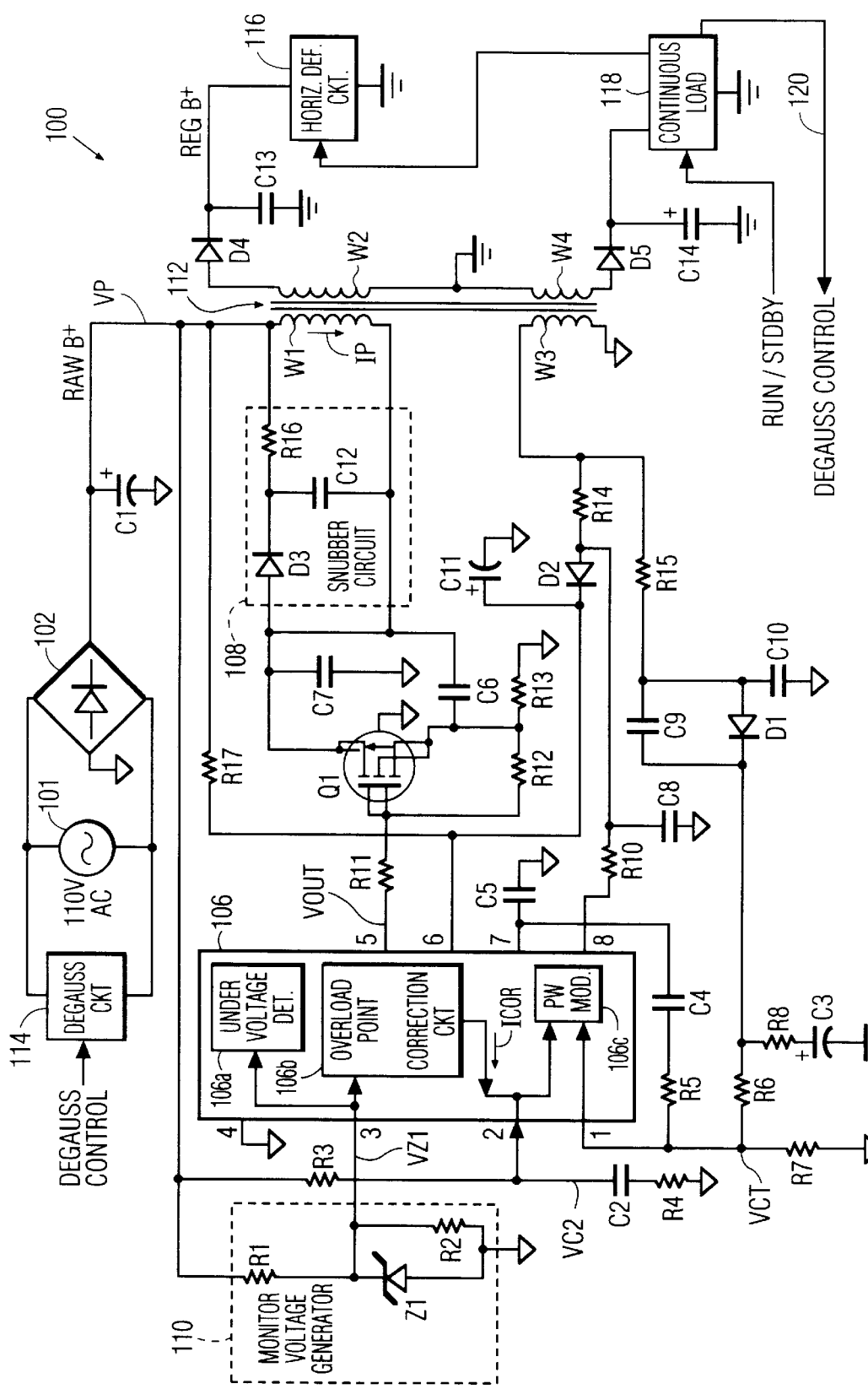

United States Patent

Shutts

[11] Patent Number: 5,825,638
[45] Date of Patent: Oct. 20, 1998

[54] SWITCHED-MODE POWER SUPPLY CONTROL CIRCUIT

[75] Inventor: Bruce Wayne Shutts, Westfield, Ind.

[73] Assignee: Thomson Consumer Electronics, Inc., Indianapolis, Ind.

[21] Appl. No.: 713,380

[22] Filed: Sep. 13, 1996

[51] Int. Cl.⁶ ................................................. H02M 3/335
[52] U.S. Cl. .............................................. 363/21; 363/56
[58] Field of Search .................................. 323/299, 300; 363/21, 56, 97

[56] References Cited

U.S. PATENT DOCUMENTS

| | | | |
|---|---|---|---|
| 4,315,305 | 2/1982 | Siemon | 363/88 |
| 4,809,150 | 2/1989 | Limuti et al. | 363/21 |
| 5,227,964 | 7/1993 | Furuhata | 363/56 |
| 5,349,515 | 9/1994 | Megeid | 363/21 |
| 5,359,276 | 10/1994 | Mammano | 323/207 |
| 5,453,921 | 9/1995 | Shutts | 363/21 |
| 5,508,588 | 4/1996 | Wu | 363/21 |
| 5,528,483 | 6/1996 | Mohandes | 363/21 |
| 5,534,768 | 7/1996 | Chavannes et al. | 323/267 |

OTHER PUBLICATIONS

Siemens—Function and Application of the Switch Mode Powersupply IC TDA 4606, 27 Jul. 1989, pp. 1–50.

*Primary Examiner*—Stuart N. Hecker
*Attorney, Agent, or Firm*—Joseph S. Tripoli; Joseph J. Laks; Sammy S. Henig

[57] ABSTRACT

A controller for a switch mode power supply includes an undervoltage protection circuit responsive to an input supply voltage indicative signal. The input supply voltage indicative signal is also coupled to a foldback point correction circuit. The correction circuit causes a decrease in a maximum duty cycle of a control signal when the input supply voltage increases and is still smaller than a predetermined magnitude. A zener diode limits the input supply voltage indicative signal in a manner to prevent a further decrease in the duty cycle when the input supply voltage exceeds the predetermined magnitude.

12 Claims, 1 Drawing Sheet

SWITCHED-MODE POWER SUPPLY CONTROL CIRCUIT

The invention relates to a switch mode power supply control circuit.

Switched-mode power supplies efficiently generate a variety of regulated voltages from a single line voltage level (e.g., 110 volts AC). One important use of these power supplies is within a television signal receiver where they are used to produce a regulated B+ voltage for the horizontal deflection circuit as well as other regulated voltages for powering various digital and analog circuits.

Typically, a switched-mode power supply contains a full-wave rectifier, a power supply controller, a switch, and an output transformer. The switch is typically a high-power transistor such as a MOSFET. To regulate the output voltages, the controller activates and deactivates (e.g., pulse width modulates) the gate of the transistor in response to power supply loading and other control parameters. The switched voltage from the transistor drives a primary winding of the transformer, while various power supply loads are connected to one or more secondary windings. As such, the power supply converts an AC input voltage into one or more DC voltages.

One particular controller is an integrated circuit available from Siemens as Model TDA 4605. This power supply controller is typically used to drive the MOSFET transistor, which in turn drives the primary coil of the transformer. This specific integrated circuit, as well as others used in the art, typically contain a control mechanism that disables the power supply when the input voltage drops below a predefined voltage level. Such protection is necessary because, to produce regulated output voltages, the switched-mode power supply increases the duty cycle of the control signal driving the transistor as the input voltage decreases. At some point, the input voltage decreases to a level where the output of the power supply is unregulated (e.g., the maximum pulse length is used to drive the transistor). Such unregulated operation can damage the power supply electronics, but is more likely to damage the load electronics.

For the integrated circuit (IC) TDA 4605, as defined in the TDA 4605 Technical Manual available from Siemens AG, dated Jul. 27, 1989, pin 3 of the integrated circuit is used for sensing or monitoring the primary input voltage (vp) for the power supply (e.g., the rectified AC voltage). The threshold voltage for disabling or deactivating the integrated circuit, and thus the power supply, is pre-established by the controller at one volt. As such, the primary input voltage (vp) is reduced using a voltage divider at the input of pin 3. By selecting appropriate resistor values within the voltage divider, a nominal value of monitoring voltage is applied to pin 3. Typically, this voltage is approximately 2.0 volts for a primary input voltage of 120 volts. When the primary input voltage falls to a level that causes the monitoring voltage at pin 3 to fall below one volt, the power supply is deactivated to avoid unregulated operation.

As stated above, this form of switched-mode power supply has been finding use within television signal receivers. However, television receivers, in particular, present peculiar loading characteristics to a power supply. Specifically, a television receiver power supply is called upon to produce a regulated B+ voltage, typically of approximately 140 volts, as well as a low voltage DC level of 16 volts for powering all of the digital and analog circuitry within the receiver. When the television receiver is switched from stand-by to run mode, a heavy load is produced by the in-rush of current into filter capacitors connected to the regulated B+ voltage. This heavy load causes the power supply to temporarily operate in an unregulated (maximum pulse width) mode, and may cause the primary input voltage to drop to a low level. Furthermore, when the degaussing circuit is activated to degauss the cathode ray tube (CRT), the main AC supply voltage is depressed due to the substantial load presented by the degaussing circuit. Consequently, the drop in line voltage could typically cause the monitoring voltage to drop below the 1 volt, first threshold level, and as such, to disable the power supply.

Therefore, there it is desirable to produce a monitoring voltage indicative of the primary input voltage, but to insure that the power supply will not be deactivated for the expected heavy loads found in a television receiver.

The IC TDA 4605 includes a foldback point correction circuit that reduces the maximum duty cycle of the MOSFET control signal, when the monitoring voltage exceeds a second threshold level of approximately 1.7 V. The monitoring voltage is applied to the correction circuit also via pin 3.

In a circuit embodying an inventive feature, a resistive voltage divider that produces the monitoring input or sense signal from the primary input voltage is designed such that the first threshold level is not attained during the expected temporary loading of the primary input voltage. However, such a voltage divider results in a higher voltage being applied to the monitoring voltage input of the controller during normal operation of the power supply. As such, an increase of the primary input voltage to a higher level, which is still within the acceptable tolerance range of the AC line voltage, can cause the monitoring voltage to rise to a level that exceeds the second threshold level at which the integrated circuit begins to limit the maximum duty cycle of the control signal that controls the MOSFET, i.e., the controller applies a foldback correction technique. When the second threshold level is exceeded, the power supply automatically limits the output power of the power supply for an increase in the primary voltage. As a result of the voltage divider design that provides sufficient headroom to overcome loading generated drop outs in the primary input voltage, the maximum power supply output could be, undesirably, significantly reduced at high primary input voltage.

In carrying out an inventive feature, to insure that such inconsequential increase in the primary input voltage does not cause the power supply to significantly reduce the maximum duty cycle of the control signal and thereby, the power output of the power supply, a zener diode is coupled to the voltage divider. The zener diode limits the magnitude of the monitoring voltage to a level that avoids further maximum duty cycle limiting when the primary input voltage further increases. Consequently, when the power supply is used in a television signal receiver, the voltage divider provides enough head room for the primary voltage to drop substantially due to degaussing circuit activation or other loading conditions, while the zener diode insures that the primary voltage can rise above its nominal voltage without causing a significant power limitation of the power supply output.

A switch mode power supply, embodying an aspect of the invention, includes a source of an input supply voltage. A switch is responsive to a first control signal having a controllable duty cycle and coupled to the source of input supply voltage for generating an output supply voltage, in accordance with the duty cycle of the first control signal. A duty cycle modulator is responsive to a second control signal for generating the first control signal and for controlling the duty cycle of the first control signal in accordance therewith in a manner to control the current pulses. An increase in the duty cycle produces an increase in a magnitude of the current pulses. The modulator is responsive to a signal that is indicative of the input supply voltage for decreasing the duty cycle when the input supply voltage increases. A limiter is coupled to the modulator for limiting the decrease in duty cycle, for a given increase in said input supply voltage, when the input supply voltage exceeds a first magnitude.

FIG. 1 depicts a schematic diagram of a switched-mode power supply incorporating the teachings of the present invention.

FIG. 1 depicts a schematic diagram of a switched-mode power supply 100 incorporating the present invention. The embodiment shown is designed for use as a power supply for a television signal receiver, wherein the power supply generates a regulated B+ voltage (e.g., 140 volts) and a low voltage (e.g., 16 volts). The regulated B+ voltage is used to power a horizontal deflection circuit and the regulated low voltage is used to power the digital and analog electronics (continuous load 118). Other applications for the power supply may require slight variation in the depicted components and their interconnections; however, such variations are well within the scope of the present invention.

The power supply contains a number of major components, including a full-wave rectifier 102, the power supply controller 106, a MOSFET transistor Q1, a monitor voltage generator 110, an output transformer 112, and a plurality of circuit components used to complete the power supply electronics. Illustratively, the input to the power supply is a 110-volt AC, 60 hertz voltage.

Rectifier 102 is a conventional full-wave bridge rectifier coupled to an AC input voltage source 101. The output of the bridge rectifier 102 is coupled to capacitor C1 approximately 680 $\mu$F). A voltage RAW B+ forms raw (unregulated) B+ voltage (also referred to herein as the primary input voltage $v_p$) having a nominal value of approximately 150 volts. Capacitor C1, connected from the output of the rectifier to ground, smoothes the voltage from the bridge rectifier such that a DC voltage, i.e., the primary input voltage $v_p$, is available at the upper terminal of the transformer's primary winding $W_1$.

The primary input voltage forms an input to the monitor voltage generator 110 which produces a monitor voltage VZ1 for the controller 106. The monitor voltage generator is discussed in detail below.

The controller is illustratively a TDA 4605 power supply controller available from Siemens AG of Munich, Germany. The eight pins of the controller are connected to signals and voltages that enable the controller to produce a pulse width or duty cycle modulated signal at pin five for controlling the duty cycle of the transistor Q1. Specifically, pin 4 of controller 106 is grounded. Pin 3 is coupled to the monitor voltage.

Pin 2 is supplied information concerning the primary current. A primary current increase in the primary winding $W_1$ is simulated as a voltage rise of a periodical, ramp voltage VC2 at pin 2 using an external RC element formed by resistor R3, capacitor C2, and resistor R4 (where R3 is approximately 360 k$\Omega$, C2 is approximately 6,800 pF; and R4 is approximately 220 $\Omega$). These elements are connected in series from the primary input voltage to ground. Pin 2 of the controller 106 is coupled to the junction of R3 and C2. A pulse width modulator 106c of the controller 106 controls the duration of the forward phase, and thus, the primary peak current, using ramp voltage VC2 that is proportional to the drain current of the transistor Q1. As indicated before, the ramp voltage is derived from the primary input voltage using the RC elements connected to pin 2, i.e., the ramp voltage simulates the primary current. Controller pin 1 is supplied secondary voltage information which internally compares the control voltage sampled from the regulating winding W3 of the transformer 112 and compares that sample voltage with an internal reference voltage.

Pin 5 generates a duty cycle modulated control signal or voltage VOUT via a push-pull output driver for rapid charge and discharge of the input capacitance of a MOSFET power transistor Q1 (Model IRF740).

Pin 6 is coupled to the supply voltage for the controller. Pin 7 forms a soft start input terminal. Capacitor C5 (0.1 $\mu$F) is connected from pin 7 to ground to reduce the pulse duration during start-up. Lastly, pin 8 is the input pin for the oscillator feedback.

In operation, the transistor Q1 is used as a power switch controlled by the controller 106. A snubber circuit is connected to the drain of the transistor Q1. The snubber circuit contains a combination of diode D3, resistor R16 and capacitor C12, which together limit the voltage overshoot when the transistor is turned off. D3 is a MUR450 diode, C12 is a 1000 pF capacitor, and R16 is a 2-watt, 30 k$\Omega$ resistor.

Together with the stray capacitance of the transformer, capacitor C7 (470 pF connected from drain terminal to ground) determines the no-load frequency, and consequently, the maximum slew rate of the drain voltage for a transistor Q1.

Transistor Q1 is driven with pulse width modulated signal VOUT produced at pin 5 of controller 106 and coupled to the gate terminal of the transistor via resistor R11 (35 $\Omega$). Furthermore, a capacitor C6 (4700 pF) is coupled from the source terminal to the drain terminal. The source terminal is coupled to ground through resistor R13 (0.27 K$\Omega$). Resistor R12 (10 k$\Omega$) is optionally connected between the source terminal and gate terminal to ensure that the transistor will not be activated if power is applied to the power supply without the controller 106 being installed. The drain terminal is coupled to one terminal of the primary winding W1 of transformer 112. Consequently, the transistor Q1 controls the current flow from the primary input voltage through the primary winding.

The secondary circuit of the transformer 112 consists of several windings, each of which has a different number of turns, polarity, and load capacity. Specifically, winding W2 forms the output voltage for the regulated B+, while winding W4 forms the output winding for the regulated 16-volt low voltage output, and winding W3 generates the feedback voltage for the controller 106.

The load circuitry includes, connected to winding W2, an output diode D4 and capacitor C13 that couple power to the horizontal deflection circuit 116. Additionally, the center tap of the output secondary winding is connected to ground, and winding W4 is coupled to diode D5 and capacitor C14. This output is the 16 volts that powers the continuous load 118 of the television receiver, e.g., all of the electronics and integrated circuits. This circuit 118 also controls the timing of when the degaussing circuit 114 is activated using degaussing control line 120. The control line for the continuous load is the run/standby control signal that essentially turns the television receiver on and off. The continuous load circuitry 118 is also coupled to the horizontal deflection circuit 116 to provide control signals therefor.

The controller 106 is started up using resistor R17 (100 K$\Omega$) as a start resistor. As such, capacitor C11 (100 $\mu$F) is charged with half-wave currents at the voltage supply pin of the controller 106, e.g., pin 6. These half-wave currents are supplied from the primary input voltage through resistor R17 (100 KΩ) to ground through series connected resistor R14 (202 Ω), diode D2 (148 Ω) and regulating winding W3. When the voltage at C11 reaches the switch-on threshold, the switched-mode power supply begins to function and supplies the feedback voltage, via winding W3, resistor R14 and diode D2. This feedback voltage, when rectified by diode D2 and smoothed by capacitor C11, forms the supply voltage ($v_{cc}$) for the controller 106 via pin 6.

A control signal or voltage VCT for pin 1 is generated in a circuit parallel to the controller supply voltage circuit. The control voltage is produced by diode D1 (ERB43) charging capacitor C3 (1.5 $\mu$F) through resistor R8 (10 Ω). The RC element, consisting of series connected R15 (30 Ω) and C10 (0.01 $\mu$F), prevents peak value rectification of high frequency components of the feedback signal.

More specifically, regulating winding W3 is coupled to one terminal of resistor R15. The other terminal of resistor R15 is coupled to capacitor C10 to ground. Diode D1 is connected at the junction of resistor R15 and capacitor C10. Capacitor C9 (1000 pF) is connected in parallel with diode D1. Diode D1 has an output voltage that is coupled to series connected R8 and C3 which couples the output of the diode to ground. The output of the diode is also coupled through resistive divider network R6 and R7 which are respectively connected in series to ground. The voltage at the junction of R6 and R7 forms control voltage VCT and is coupled to pin 1 of the controller 106. These resistors define the no-load frequency of oscillation of the controller 106. Therefore, they are typically 0.1% accurate resistors having R6 being 5.49 KΩ, and R7 being 174 Ω. Control voltage VCT is coupled to a pulse-width modulator 106c within controller 106 that controls the duty cycle modulation of voltage VOUT for regulating, for example, voltage REGB+.

During the power supply start-up, capacitor C5 at the soft-start pin (e.g., pin 7), influences the duration of the forward phase by controlling the error voltage of the pulse width modulator. The controller detects the end of the transformer discharge phase via resistor R10 (20 KΩ) that is coupled at one end to controller pin 8 and at the other end to resistor R14, and ultimately to the regulating winding W3. Additionally, capacitor C8 (0.022 $\mu$F) is coupled from the junction of R10 and R14 to ground. At this point, the voltage changes polarity from positive to negative, i.e., the voltage represents zero crossings.

A voltage VZ1, embodying an inventive feature, is generated by the monitor voltage generator 110 and is coupled to pin 3 of the controller 106. Voltage VZ1 is used both for determining the minimum line voltage that will allow the power supply to operate and for controlling a foldback point correction circuit 106b within the controller 106.

The monitor voltage generator 110 contains resistor R1 (270 kΩ) coupled in series with resistor R2 (5100 Ω) to form a resistive voltage divider network with respect to primary input voltage RAW B+. The junction of the two resistors is coupled to the pin 3 of controller 106. Furthermore, a zener diode Z1 (B2X55/C3VO), embodying an inventive feature, is connected in parallel with resistor R2 from the junction point to ground. Zener diode Z1 forms a limiter for limiting the maximum voltage across R2 to the breakdown voltage of the zener diode Z1. Consequently, the voltage at the output of the monitor voltage generator 110 tracks the primary input voltage RAW B+ up to the threshold point where the zener diode Z1 begins to conduct.

The controller 106 includes an under-voltage detector 106a that uses a fixed, internal voltage threshold that causes the controller to disable the power supply whenever the monitor voltage VZ1 drops below a first threshold voltage. For the TDA 4605 integrated circuit, this first threshold voltage is one volt. As such, the divider network of R1 and R2 defines a voltage at the output that under typical operation would not cause the controller to deactivate the power supply.

In one particular application, e.g., a television signal receiver, a degaussing circuit 114 for a television signal receiver is typically connected directly across the input AC power. Consequently, when the degaussing circuit is activated, it will typically cause a drop in the AC voltage that is applied to the input of the voltage rectifier 102. Consequently, the primary input voltage RAW B+ will drop significantly during the degaussing period. Since this is a normal behavior of a conventional television receiver circuit, it is desirable that the monitor voltage generator 110 be designed such that the controller 106 will not deactivate the power supply during the degaussing period.

For a primary input voltage of 120 volts and using a resistive divider of 270 KΩ for R1 and 5100 Ω for R2, the nominal voltage VZ1 at the voltage monitor input pin is 2 volts. Such a value for the voltage monitor voltage will avoid power supply deactivation during the degaussing period or other heavy load period.

When the duty cycle of voltage VOUT is at the maximum as a result of an overload condition, an increase in voltage RAW B+, produced by an increase in the AC line voltage, causes the voltage across primary winding $w_1$ to increase. As the primary input voltage RAW B+ rises, the available input power to the power supply increases which could damage the power supply when the power supply is overloaded. During a period of overloaded, unregulated output, the modulator 106c generates the voltage VOUT having a maximum duty cycle for driving transistor Q1. As a result, a primary current IP in winding $W_1$ of transformer 112 has also a maximum duty cycle. Therefore, undesirably an increase in voltage RAW B+ can produce a large voltage across the transistor that could damage the transistor or other circuitry.

To maintain the power supply within a safe operation range, the controller 106 includes what is known as a foldback or overload point correction circuit 106b. This foldback point correction circuit reduces the maximum duty cycle of voltage VOUT when the primary input voltage exceeds a predetermined magnitude. An increase above the predetermined magnitude causes the foldback point correction circuit 106b to decrease the maximum duty cycle of signal VOUT as voltage RAW B+ increases. The decrease is done by generating a correction current ICOR that is coupled to capacitor C2 causing an increase in the rate of change of voltage VC2 at pin 2 of controller 106 when voltage VZ1 exceeds a second threshold voltage.

When voltage RAW B+ increases and causes voltage VZ1 to further increase above the second threshold voltage an increase in current ICOR produces a decrease in the maximum duty cycle of signal VOUT, in a well know manner. The second threshold voltage occurs when voltage VZ1 is above a voltage level of approximately 1.7 V. The result is that, when voltage RAW B+ further increases the maximum duty cycle decreases proportionally. The decrease in the maximum duty cycle tends to stabilize the maximum power produced in the power supply against an increase of voltage RAW B+. On the other hand, an increase of voltage VZ1 when voltage VZ1 is below the 1.7 V level, does not affect current ICOR and the duty cycle of voltage VOUT.

Because the divider network (R1 and R2) establishes a sufficiently large monitor voltage VZ1 that provides sufficient headroom for preventing power supply shutdown when the degaussing circuit is activated, primary input voltage RAW B+ may be at a level that causes voltage VZ1 to exceed the second threshold voltage of circuit 106b by an excessive amount even when voltage RAW B+ is within the normal tolerance range. Therefore, disadvantageously, the maximum duty cycle may further decrease by a significant amount in a manner to lower the maximum power that can be derived. Such significant reduction in power capability can occur even though primary input voltage is not truly at such a high level that could damage the power supply.

In accordance with an inventive feature, to prevent current ICOR from further reducing the maximum duty cycle of voltage VOUT when voltage RAW B+ increases above a threshold magnitude that corresponds to voltage VZ1 being equal to 3 V, the monitor voltage generator 110 contains the zener diode Z1 operating as a limiter which limits the primary input voltage indicative voltage VZ1 to 3 V. Consequently, the monitor voltage VZ1 can never rise above a pre-defined level (e.g., 3 volts) that would otherwise cause the foldback point correction circuit 106b within the controller 106 to further decrease the maximum duty cycle. In this way, advantageously, the decrease in the maximum duty cycle as a function of an increase in voltage RAW B+ is limited.

The decrease in the duty cycle of voltage VOUT produced by current ICOR, for a given increase in voltage RAW B+, is limited when voltage RAW B+ is greater than a threshold magnitude that corresponds to voltage VZ1 equal to 3 V. In contrast, the decrease in the duty cycle produced by current ICOR is not limited but varies proportionally to voltage RAW B+ when voltage VZ1 is between 1.7 V and 3 V. Thus, zener diode Z1 operates as a limiter for limiting the decrease in the duty cycle when the voltage RAW B+ exceeds the threshold magnitude relative to when voltage RAW B+ does not exceed the threshold magnitude. An increase in voltage RAW B+ that produces voltage VZ1 below the second threshold voltage of 1.7 V, does not affect current ICOR.

Specifically, for the TDA 4605 integrated circuit control, the zener diode has a value of three volts. Consequently, the input signal to the monitor voltage generator cannot rise above the three volt level before the zener diode will begin to conduct current to ground. As such, the monitor voltage generator establishes a range of voltages that pre-defines a range of primary input voltages at which the controller 106 operates in a normal manner that avoids both an undervoltage power supply deactivation and a further decrease in the maximum duty cycle. The input voltage dynamic range is thereby extended.

What is claimed is:

1. A switch mode power supply, comprising:
   a source of an input supply voltage;
   a switch responsive to a first control signal having a controllable duty cycle and coupled to said source of input supply voltage for generating an output supply voltage, in accordance with said duty cycle of said first control signal;
   a duty cycle modulator responsive to a second control signal for generating said first control signal and for controlling said duty cycle of said first control signal in accordance therewith, said modulator being responsive to a signal that is indicative of said input supply voltage for decreasing said duty cycle when said input supply voltage increases; and
   a limiter coupled to said modulator for limiting the decrease in duty cycle, for a given increase in said input supply voltage, when said input supply voltage exceeds a first magnitude.

2. A power supply according to claim 1, wherein said duty cycle of said first control signal varies within a control range, in accordance with said second control signal, and wherein said limiter limits a decrease of said duty cycle when said duty cycle is at an end of said control range.

3. A power supply according to claim 1, wherein said limiter comprises a clamper coupled in a signal path of said input supply voltage indicative signal for clamping said input voltage indicative signal, when said input supply voltage exceeds said first magnitude, and for disabling the clamping thereof, when said input supply voltage does not exceed said first magnitude.

4. A power supply according to claim 3, wherein said voltage clamper comprises a diode.

5. A power supply according to claim 3, further comprising a disabling circuit responsive to said input supply voltage indicative signal for disabling said output supply voltage, when said input supply voltage is smaller than a second magnitude and wherein said voltage clamper is coupled in a common signal path of said input supply voltage indicative signal with respect to each of an input of said disabling circuit and an input of said limiter.

6. A power supply according to claim 1, wherein said modulator comprises a foldback point corrector for decreasing said duty cycle, when said input supply voltage increases and wherein said limiter is coupled to said corrector.

7. A power supply according to claim 1, wherein said second control signal is produced in a feedback path for regulating said output supply voltage.

8. A power supply according to claim 1, wherein said input supply voltage indicative signal is coupled to said modulator from said source of input supply voltage via a signal path that bypasses said switch.

9. A power supply according to claim 8, wherein said limiter comprises a clamp coupled in said signal path for clamping said input supply voltage indicative signal, when said input supply voltage exceeds said first magnitude, and for disabling the clamping operation, when said input supply voltage does not exceed said first magnitude.

10. A power supply, comprising:
    an input supply voltage, a transformer and a switch coupled for switch mode generation of a regulated output supply voltage, said switch being responsive to a first control signal having a controllable duty cycle;
    a duty cycle modulator for generating said first control signal responsive to a second control signal for limiting a duty cycle of said switch, said modulator operating in a first mode when said second control signal is in a predetermined range of voltage levels and operating in a second mode when said second control signal is outside of said range; and
    a voltage monitor circuit for generating said second control signal, said second control signal representing a first proportion of said input supply voltage in a first range of input supply voltage values and a second proportion of said input supply voltage in a second range of input supply voltage values.

11. A power supply according to claim 10 wherein said voltage monitor circuit comprises a clamp coupled in a signal path of said second control signal.

12. A power supply according to claim 11, wherein said second signal is coupled to said modulator from said input supply voltage via a signal path that bypasses said switch.

* * * * *